United States Patent
Suzuki et al.

(10) Patent No.: US 6,298,164 B1
(45) Date of Patent: Oct. 2, 2001

(54) PCL CONVERSION OF JETSEND IMAGES

(75) Inventors: Stephanie Ann Suzuki, Irvine; Don Francis Purpura, Yorba Linda; Michael Lee Yeung, Mission Viejo, all of CA (US)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/165,112

(22) Filed: Oct. 2, 1998

(51) Int. Cl.[7] ............................. G06K 9/36; G06F 15/16
(52) U.S. Cl. ......................... 382/245; 358/1.15; 709/230
(58) Field of Search .................................... 382/232, 245, 382/244; 358/1.15, 1.13, 1.16, 261.1; 341/59, 63, 50; 709/230, 236, 237

(56) References Cited

U.S. PATENT DOCUMENTS

| | | | |
|---|---|---|---|
| 5,457,772 | * 10/1995 | Shannon | 358/1.9 |
| 5,469,532 | * 11/1995 | Gerlach et al. | 358/1.2 |
| 5,611,024 | * 3/1997 | Campbell et al. | 358/1.15 |
| 5,649,074 | * 7/1997 | Welborn | 358/1.15 |
| 5,689,255 | * 11/1997 | Frazier et al. | 341/63 |
| 5,706,410 | * 1/1998 | Bagley et al. | 358/1.13 |
| 5,710,908 | * 1/1998 | Man | 709/230 |
| 5,732,198 | * 3/1998 | Deppa et al. | 358/1.15 |
| 5,826,017 | * 10/1998 | Holzmann | 709/230 |
| 5,970,221 | * 10/1999 | Bolash et al. | 358/1.16 |

OTHER PUBLICATIONS

"HP JetSend™ Communications Technology, Section I: Architectural Overview; Section II: Protocol References; and Section III: E–Material Specification", Version 1.0, Hewlett–Packard Company, 1997.

"What is HP JetSend?", <http//www.jetsend.com/developer/Whatis.html>, Hewlett–Packard, (visited Sep. 14, 1998), 2 pages.

"HP JetSend Technology: Making Device–To–Device Communication Simple", <http//www.jetsend.com/press/Background.html>, Hewlett–Packard, (visited Sep. 14, 1998), 4 pages.

"The JetSend Protocol" <http//www.jetsend.com/press/Whitepaper.html>, Hewlett–Packard, (visited Sep. 14, 1998), 8 pages.

"JetSend Protocol on IrDA Application Note," <http/www.jetsend.com/developer/irda.html>, Hewlett–Packard, (visited Sep. 14, 1998), 6 pages.

* cited by examiner

*Primary Examiner*—Wenpeng Chen
(74) *Attorney, Agent, or Firm*—Fitzpatrick, Cella, Harper & Scinto (57) ABSTRACT

Conversion of JETSEND-compressed image data into PCL raster image data compatible with a PCL printer. The JETSEND-compressed image data is not decompressed prior to conversion of PCL raster image data, but rather is converted to a PCL raster image in situ by monitoring control byte information in the compressed image data so as to determine where one scan line ends and another begins.

12 Claims, 7 Drawing Sheets

FIG. 6B

PCL CONVERSION OF JETSEND IMAGES

BACKGROUND OF THE INVENTION

1. Field of the Invention

The present invention relates to conversion of compressed images received in JETSEND protocol to PCL (printer control language)-compatible images. Specifically, according to the invention, a compressed JETSEND image is converted to a compressed PCL raster image, without the need of decompression.

2. Description of the Related Art

JETSEND is a device-to-device communications protocol for local and wide area networks, that allows network devices to intelligently negotiate information exchange between them, without the need of involving a separate computer to negotiate the conversation. The JETSEND protocol allows the two devices to connect over a network, negotiate the best possible data type, provide device status, and exchange information, all without intervention from a user or from a third device such as a computer to negotiate the communication between the two devices. JETSEND protocol is described at length in "HP JETSEND™ Communications Technology, Section I: Architectural Overview; Section II: Protocol References; and Section III: E-Material Specification", Version 1.0, Hewlett-Packard Company, 1997. These documents are incorporated by reference as if set forth in full herein.

As an example, a JETSEND-enabled scanner (or other image input device such as a digital camera) can capture image information and then send the image information directly to a JETSEND-enabled printer (or other output device such as a facsimile or a projector) at a remote network location. According to the JETSEND protocol, the scanner would send information about its capabilities to the printer. Such information would include, for example, the available formats, color capabilities, bit length, and image resolution, of images that the scanner could acquire. In response, the printer would return information concerning the format in which the image information should be sent. The image information is captured by the scanner and thereafter sent directly to the printer for output. All such communications occur without the intermediary of a user or a computer such as a server to negotiate the communication, thereby enabling the scanner to communicate directly with the printer.

One problem currently being encountered with JETSEND concerns modification of legacy systems, which do not incorporate JETSEND protocol, into JETSEND-enabled systems. For example, current networked printers represent an enormous installed base of network printers that are not currently JETSEND-enabled. These networked printers communicate on a local area network through software on a network interface card (NIC), It has therefore been considered to include, within the NIC, software which communicates using the JETSEND protocol.

Even if this solution is adopted, however, additional problems remain. Specifically, according to the JETSEND protocol, image data is transmitted in a compressed format known as modified TIFF (tagged image file format). According to the modified TIFF compression, image data is compressed in a mixed format in which parts of the image data are run length encoded and other parts maintain a literal representation of uncompressed image data. The run length encoded portions include a first byte that is a control byte that specifies a repeat count, and a second byte which represents the data that will be repeated. The literal representation includes a first byte which is a control byte that specifies the byte count of data that follows, which simply follows in uncompressed image data format. (The literal representation is more efficient for small amounts of rapidly alternating data, where run length encoding would not result in any compression but rather would result in data expansion.)

On the other hand, most printers are not equipped to process modified-TIFF compressed data directly. In particular, printers operating under the page description language known as PCL require image data one scan line at a time, and cannot process image data for an entire image. However, to decompress the modified-TIFF compressed data, to thereafter separate each scan line from other scan lines, and to thereafter transmit each scan line to the printer, would require more processing time than is currently acceptable in conventional NIC's.

SUMMARY OF THE INVENTION

The present invention addresses the foregoing difficulties by providing for conversion of JETSEND-format modified-TIFF compressed data directly to PCL-compressed data, all without the intermediary of decompressing the modified-TIFF image data.

According to the invention, the control byte information in each of the run length encoded and literal representation of the TIFF-compressed data is monitored to determine when one scan line of the image has been completed. The modified-TIFF image data is stored into a buffer, and when one scan line has been completed, the control byte of the final segment (be it a run length encoded segment or a literal representation) is modified so that the image data represents exactly a full scan line. The buffered data is then prefixed with a PCL command sequence which includes a byte count for the modified-TIFF data stored in the buffer, and the PCL sequence is transmitted together with the buffered image data to the printer. Thereafter, a new scan line is started in the buffer, beginning with any un-transmitted data that might have been broken up from transmission of a prior scan line.

By virtue of the foregoing arrangement, since the JETSEND compressed image data is never decompressed during conversion to a PCL-compatible format, significant performance advantages can be obtained in comparison to systems which decompress the JETSEND-compressed image data.

In further aspects, the invention modifies the JETSEND-compressed image data as it is converted to PCL compatible format. For example, by convention, image data supplied to a printer uses a bit set to "ONE" to represent a black pixel and a bit set to "ZERO" to represent a white pixel. This convention is exactly opposite to the JETSEND image specification, where a "ZERO" represents black. During Conversion from JETSEND compressed data to PCL-compatible format, however, the invention can flip bits. Specifically, as run-length encoded representations are being buffered, the bits on the repeat byte are flipped. Similarly, as literal representations are being buffered, the uncompressed image data bytes are flipped as well.

This brief summary has been provided so that the nature of the invention may be understood quickly. A more complete understanding of the invention can be Qbtained by reference to the following detailed description of the preferred embodiment thereof in connection with the attached drawings.

BRIEF DESCRIPTION OF THE DRAWINGS

FIG. 6 is a flow diagram showing process steps for JETSEND agent according to one representative embodiment of the invention.

DETAILED DESCRIPTION OF THE PREFERRED EMBODIMENT

Figure 1:
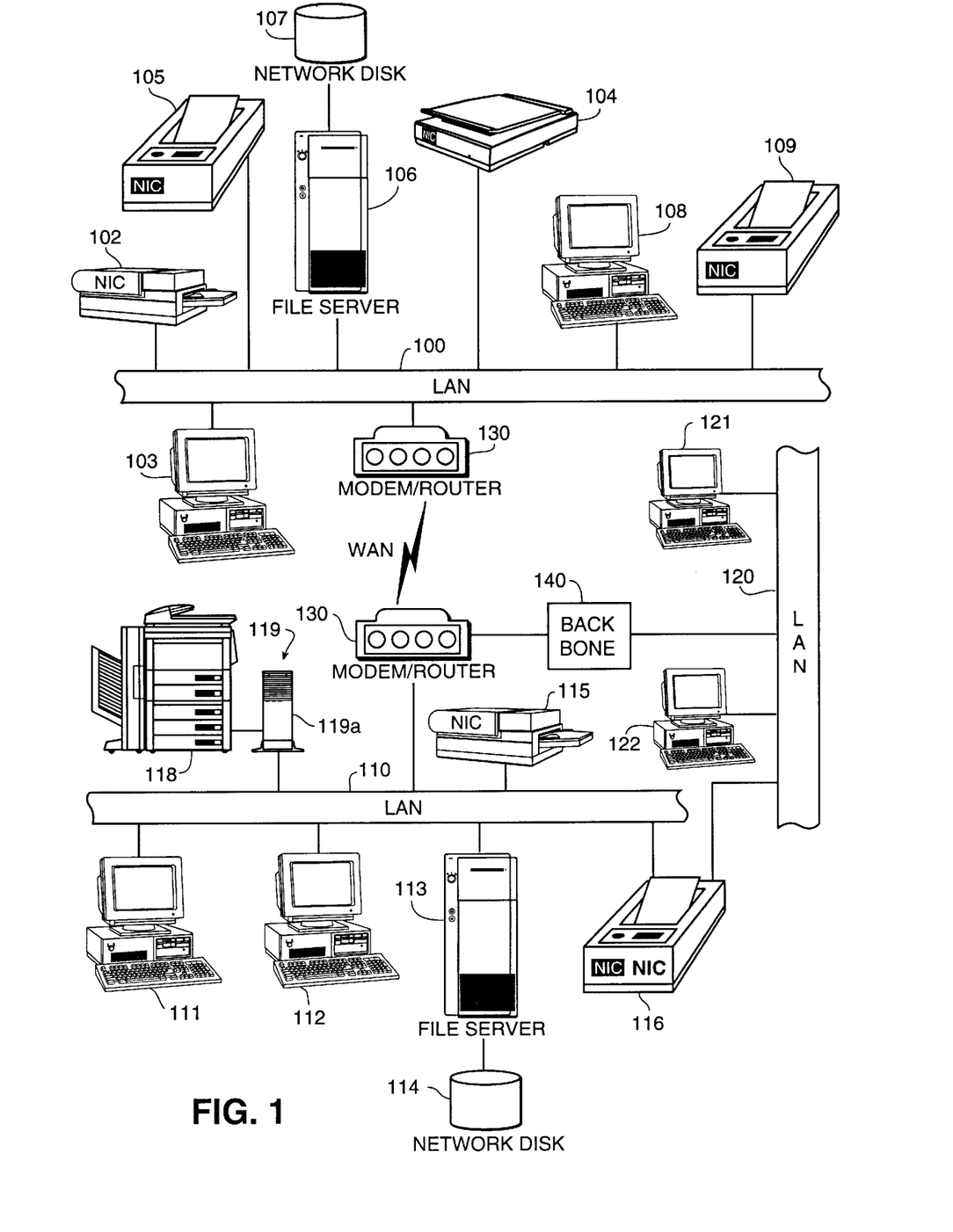
FIG. 1 is a topological view of a representative wide area network to which the present invention may be applied.

FIG. 1 is a topological view of a representative wide area network to which the present invention may be applied. Shown in FIG. 1 are three separate local area networks (LAN's),100, 110 and 120, connected to each other through modems 130 and backbone 140 into an overall wide area network (WAN). Each of LAN's 100, 110 and 120 may be configured physically into any of the known network configurations such as Ethernet or Token Ring, and each LAN may carry network transmissions using one or more network protocols over one or more frame types. Because of the diversity of protocols and frame types, the wide area network of FIG. 1 is often referred to as a "heterogeneous" network.

For purposes of explanation, it is assumed that at least some of the LAN's are physically dissimilar; accordingly, in this representative embodiment, LAN's 100 and 110 are configured as Ethernet networks while LAN 120 is configured as a Token Ring network.

Connected to each of the LANIs are plural workstations and plural networked devices. For example, connected to LAN 100 are workstations 103 and 108, together with networked devices including printer 102, scanner 104, and printers 105 and 109. Also connected to LAN 100 is file server 106 which manages accept to Liles stored on large capacity network disk 107. Other unshown networked devices and workstations may also be connected to LAN 100.

Connected to LAN 110 are workstations 111 and 112, and networked devices including printers 115 and 116 and multi-function (print, scan and fax) device 118. (Actually, multi-function device 118 is connected to LAN 110 through a network interface 119, as explained more fully below.) LAN 110 also includes file server 113 which manages access to large capacity network disk 114.

Connected to LAN 120 are workstations 121 and 122, as well as networked devices such as printer 116.

Each of the networked devices includes a network interface such as a network interface card ("NIC") or a stand-alone network interface. The function of the network interface is to receive and to send network transmissions to and from the networked device. For example, in the case of printer 102 which includes a NIC, the function of the NIC is to receive print jobs from LAN 100, such as a print job from a print queue in file server 106. Likewise, another function of the NIC for printer 102 is to send transmissions from printer 102 to LAN 100, such as transmissions which poll for the presence of print jobs in the print queue. Such transmissions of the network interface will hereinafter be referred to as "device-specific" transmissions, since they relate to the purpose of the networked device.

At least some of the devices on the WAN are JETSEND-enabled devices. For example, scanner 104 and printer 115 might be JETSEND-enabled, meaning that such devices can communicate directly over the WAN, without the intermediary of some other computing device such as one of the workstations, so as to cause an original document to be scanned in by scanner 104 and printed by printer 115. Other JETSEND-enabled devices, both input and output, are also possible, such as a JETSEND-enabled networked camera, a JETSEND-enabled networked whiteboard, a JETSEND-enabled networked facsimile, a JETSEND-enabled networked projector, a JETSEND-enabled networked workstation, and the like. JETSEND communications between such devices will hereinafter be referred to as "JETSEND" transmissions.

Each networked device on the WAN includes some network interface. For example, printers 102, 105, 109 and 115 each include a single NIC. Scanner 104 includes a single NIC. Multi-function device 118 includes stand-alone network interface 119 which includes a multi-function controller 119a. JETSEND software operates on the network interface.

Figure 2:
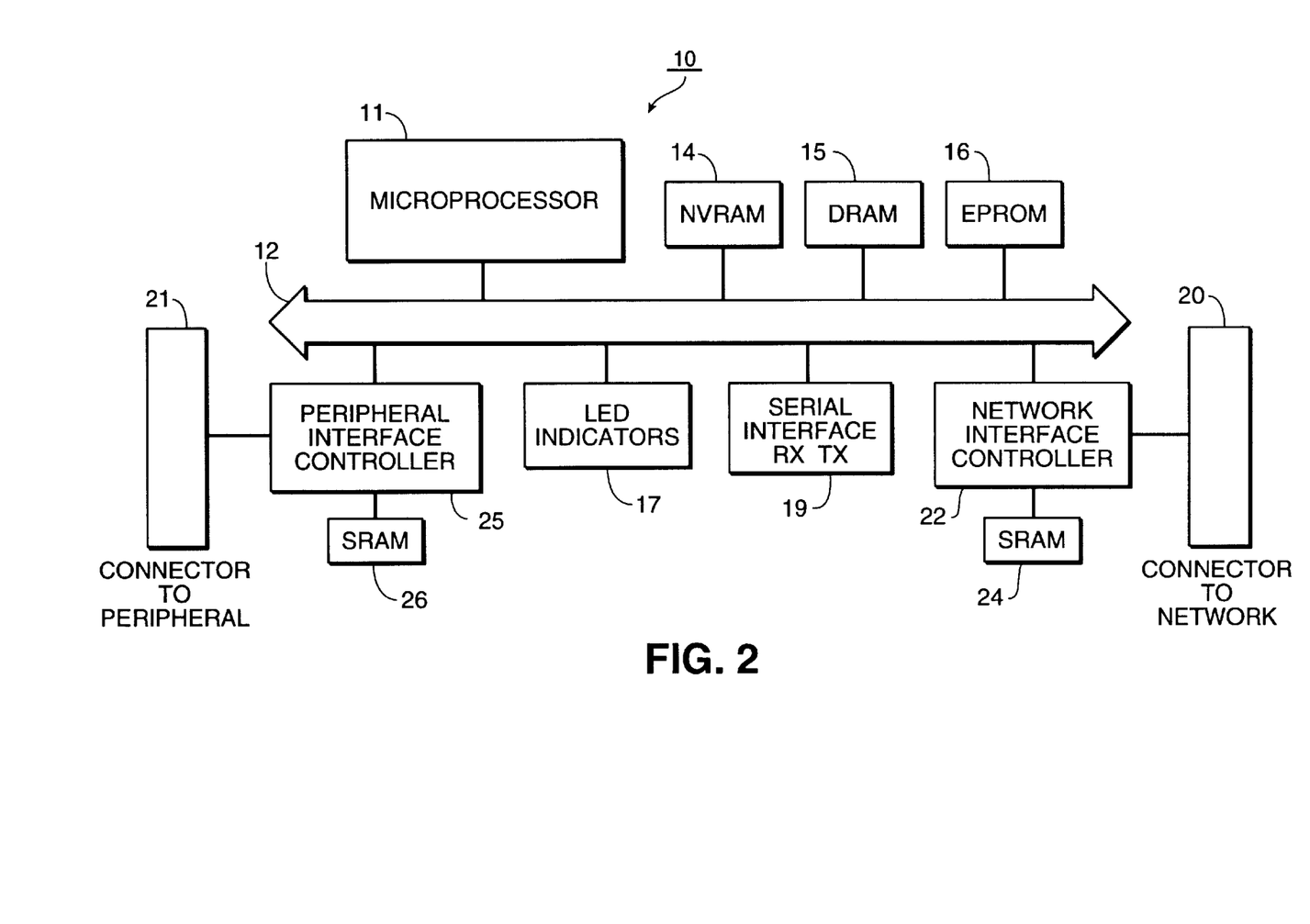
FIG. 2 is a block diagram of a representative network interface.

FIG. 2 is a block diagram of a representative network interface, such as a network interface card, for interfacing a networked device to a network. As shown in FIG. 2, the network interface includes central processing unit (CPU) 11 such as an Intel 80188 8-bit programmable microprocessor which is interfaced to computer bus 12. Also interfaced to computer bus 12 are non-volatile RAM (NVRAM) 14, dynamic RAM (DRAM) 15, electrically erasable programmable read only memory (EEPROM) 16, drivers for LED indicators 17, and serial interface 19 which includes both a transmit and a receive terminal. Configuration parameters and other important information concerning the configuration of the network interface are ordinarily stored in NVRAM 14, where such information may be stored between power cycles. Process steps for execution by microprocessor 11 are stored in EEPROM 16, but in general, before those process steps are executed, they are copied from EEPROM 16 into DRAM 15 for execution out of DRAM 15. LED indicators 17 are provided so as to give a user a general indication as to the processing status of the network interface, and may include, for example, indicator LEDs for power and data communication. Serial interface 19 is provided so as to allow local serial access to the network interface.

As mentioned previously, the interface is between the local area network and the networked device, and is therefore usually provided with a connector 20 for connecting to the LAN as well as a connector 21 for connecting to the networked device. A network interface controller 22 which is connected to bus 12 and to network connector 20, provides hardware interface for capturing and assembling network transmissions received by the network interface and transmitted onto the LAN. Static RAM (SRAM) 24 is provided for network interface controller 22 so as to store, on a temporary basis, such network transmissions.

On the peripheral side, peripheral interface controller 25, which is connected to bus 12 and peripheral connector 21, provides peripheral interface between the network interface and the networked device serviced by the network interface. Peripheral controller 25 may be of any of a variety of different controllers, and can, for example, be constructed for a bi-directional interface (such as a SCSI interface, an IEEE 1284 interface, a dual port RAM interface, a shared RAM interface, and the like) or a uni-directional interface (such as a standard Centronix RS-232 interface or the like).

Peripheral interface controller 25 is provided with SRAM 26 for temporary storage of data transmitted between the network interface and the networked device.

JETSEND software operates on the network interface card shown in FIG. 2, as described more fully below in connection with FIG. 2.

Figure 3:
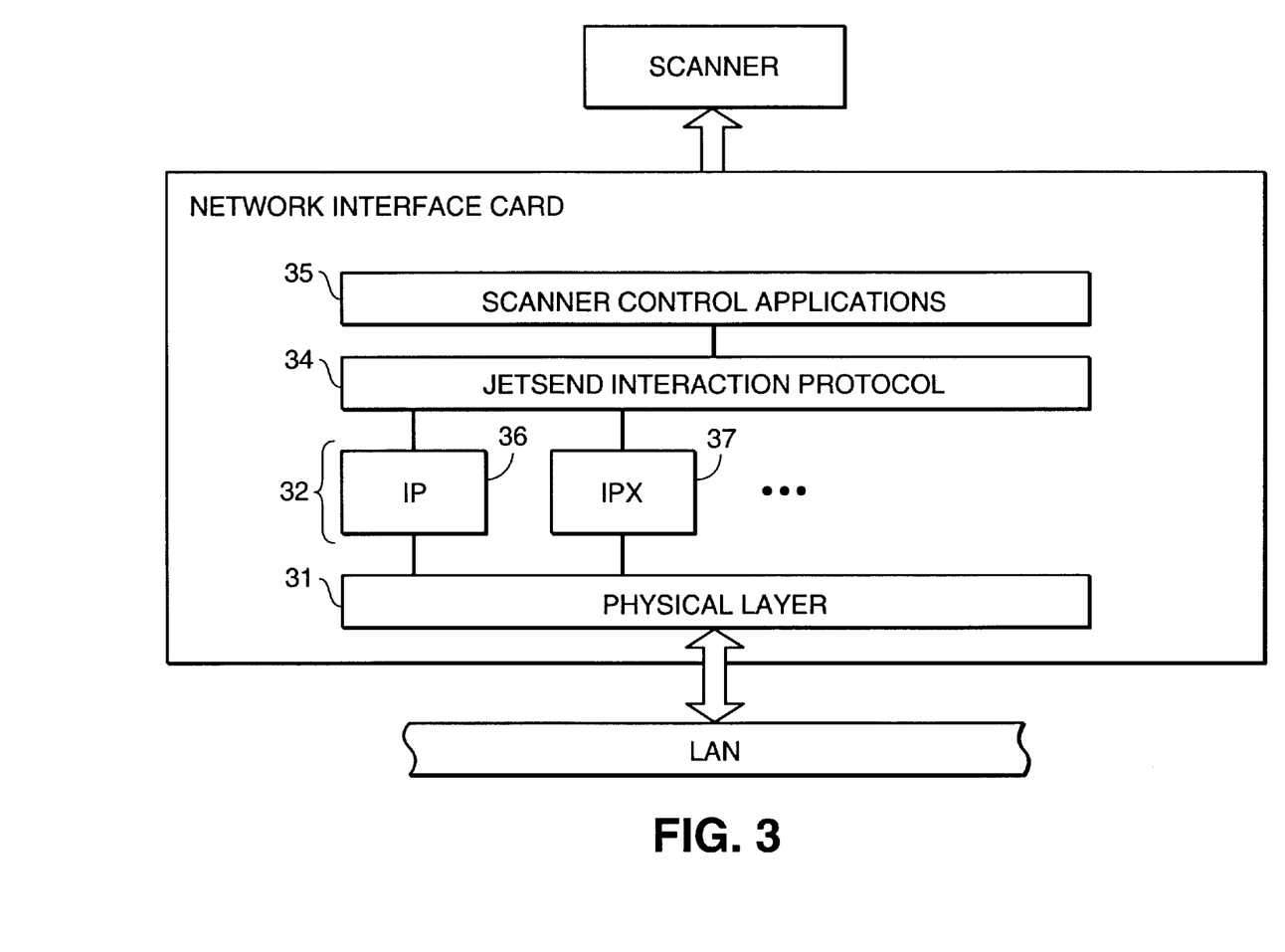
FIG. 3 illustrates the architecture of software in the network interface.

FIG. 3 illustrates the architecture of software for an image input device such as scanner 104, as stored in and executed by the NIC. Such software is stored as computer-executable process steps in a computer readable medium, such as the aforementioned EEPROM 16. As shown in FIG. 3, the architecture of the software extends through the NIC between the LAN and the networked input device, so as to provide interface for the networked device to the LAN. Thus, the architecture of the software includes physical layer 31, plurality of different protocol stacks 32, JETSEND interaction protocol 34, and device-specific applications such as scanner control application 35. Device-specific applications are applications concerning the functionality of the network device, such as the aforementioned scanner control application 35.

JETSEND interaction protocol 34 provides for communication between JETSEND-enabled devices, and preferably is implemented using a number of layered protocols, with each protocol layer communicating with the corresponding layer in the other device. The layers preferably include interaction policies, interaction protocol, session protocol and reliable messaging protocol.

Plural protocol stacks 32 are preferred since they increase the flexibility of a networked device by allowing it to communicate via the network interface on the LAN using plural different network protocols. In the FIG. 3 example, two different network protocol stacks are shown, including IPX protocol stack 36 and IP protocol stack 37. Other protocol stacks may also be provided, such as a DDP protocol stack, a UDP protocol stack, a NetBIOS protocol stack, or an AppleTalk protocol stack. Of course, it is possible for a networked device to operate over even a single protocol stack.

Figure 4:
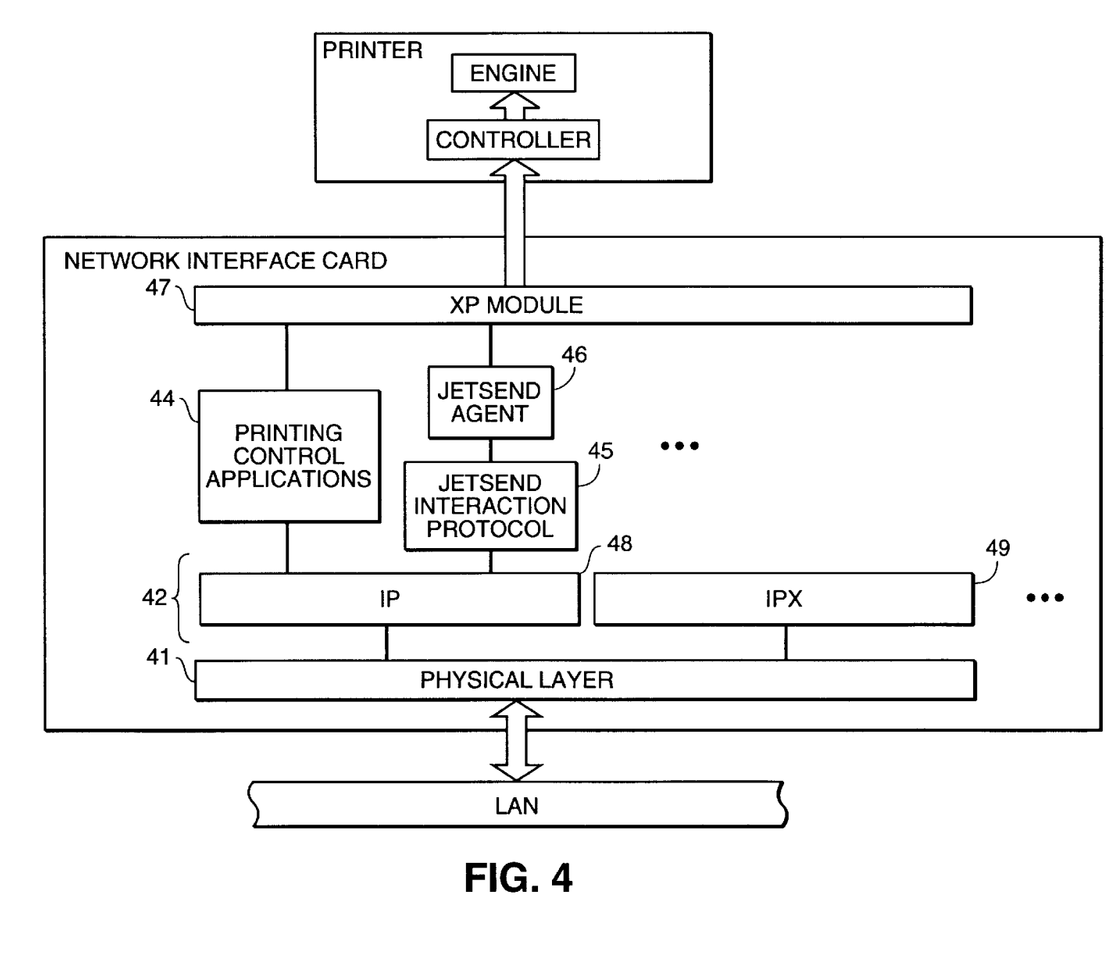
FIG. 4 illustrates the architecture of software for an image output device.

FIG. 4 illustrates the architecture of software for an image output device such as printer 115, as stored in and executed by the NIC for the printer. In much the same way as the software for image input devises, such software is stored as computer-executable process steps in a computer readable medium, such as in EPROM 16. As shown in FIG. 4, the architecture of the software extends through the NIC between the LAN and the networked output device, so as to provide interface for the networked device to the LAN. Thus, the architecture of the software in FIG. 4 includes physical layer 41, a plurality of different protocol stacks 42, device-specific applications such as printing control applications 44, a JETSEND interface protocol 45, and a JETSEND agent 46. The NIC further includes a printer interface module such as XP module 47. XP module 47 provides process steps for a standard interface between the NIC and the printer. In particular, and as illustrated in FIG. 4, the printer includes a print engine and a print controller, and XP module 47 interfaces directly to the print controller over whatever interface is provided therebetween, such as the aforementioned bi-directional interfaces or the aforementioned uni-directional interfaces.

In much the same way as plural protocol stacks increase the flexibility of a networked input device, plural protocol stacks 42 increase the flexibility of a networked output device such as the printer, by allowing the NIC to communicate via the network interface using plural different output protocols. Again, in FIG. 4, two different protocol stacks are shown including IP protocol stack 48 and IPX protocol stack 49. Other protocol stacks may also be provided; and it is further possible for the networked output device to operate over even a single protocol stack.

In the FIG. 1 example, printer control application 44, JETSEND interaction protocol 45 and JETSEND agent 46 are all shown as operating over the IP protocol stack 48. It is to be understood that this is representative only, and it is typical for printer control applications, JETSEND interface protocols, and JETSEND agents also to operate over each of the different protocol stacks included in the NIC.

JETSEND interaction protocol 45 is similar to but complementary to JETSEND interaction protocol 34.

JETSEND agent 46 operates to translate JETSEND communications from a JETSEND-enabled input device into output device-specific format, and then to feed the output device-specific format to XP module 47 for printout by the printer. Thus, one benefit of the architecture shown in FIG. 4 is that it enables conversion of legacy devices (meaning devices which are non JETSEND-enabled) into JETSEND-enabled devices simply through the insertion of JETSEND interaction protocol 45 and JETSEND agent 46 into existing software architecture.

According to the invention, PCL conversion of JETSEND images is performed by JETSEND agent 46. Thus, JETSEND agent 46 includes computer executable process steps that operate to receive JETSEND images, convert such images to PCL format which is understandable by a print controller, and transmit such converted PCL images to XP module 47 for transmission to the printer.

Figure 5:
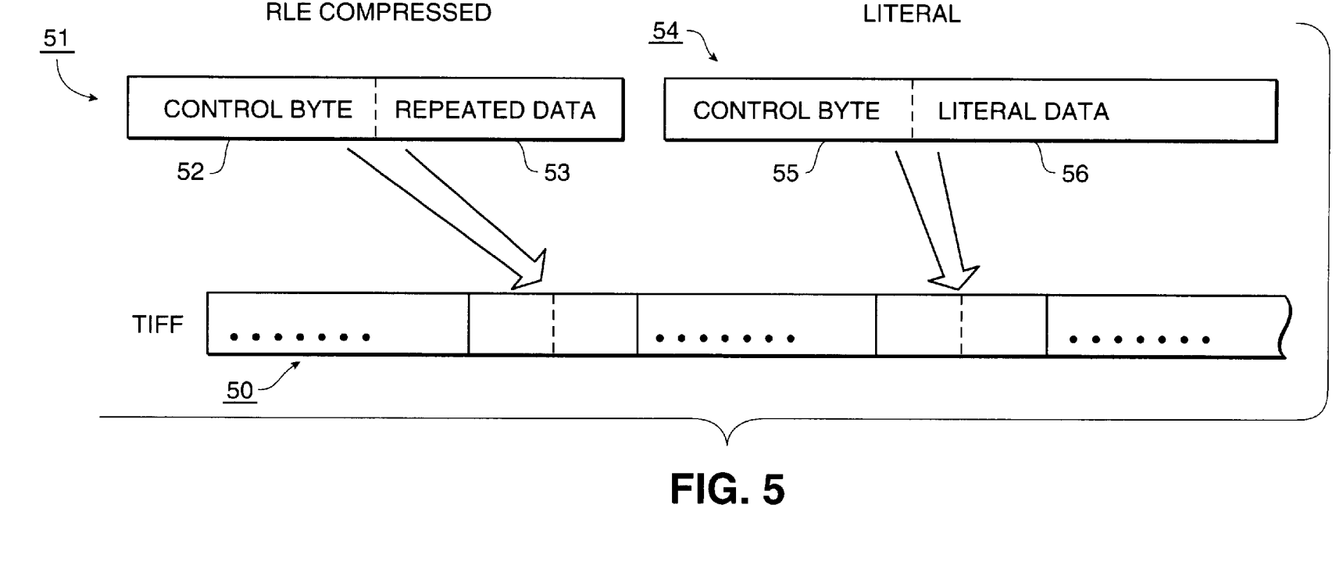
FIG. 5 is a diagram illustrating format for JETSEND images.

FIG. 5 is a diagram illustrating format for JETSEND images. As shown in FIG. 5, according to the JETSEND protocol, image data 50 is transmitted in a compressed format known as modified TIFF (tagged image file format). According to the modified TIFF compression format, image data is compressed in a mixed format in which parts of image data 50 are run length encoded and other parts maintain a literal representation of uncompressed image data. Run length encoded portions are illustrated at 51 and include a control byte 52 and a repeated byte 53. The control byte specifies a repeat count by which the repeated data is repeated. Literal portions are illustrated at 54 and include a control byte 55 followed by literal data 56. The control byte specifies the byte count of the data in literal data 56, and literal data 56 is simply uncompressed image data. Thus, as illustrated in FIG. 5, according to the JETSEND protocol, modified TIFF image data is transmitted from an image input device such as scanner 104 to an image output device such as printer 115 in modified TIFF compression which includes a mixed format by which parts of the image data are run length encoded and other parts maintain a literal representation of uncompressed image data.

Figure 6A:
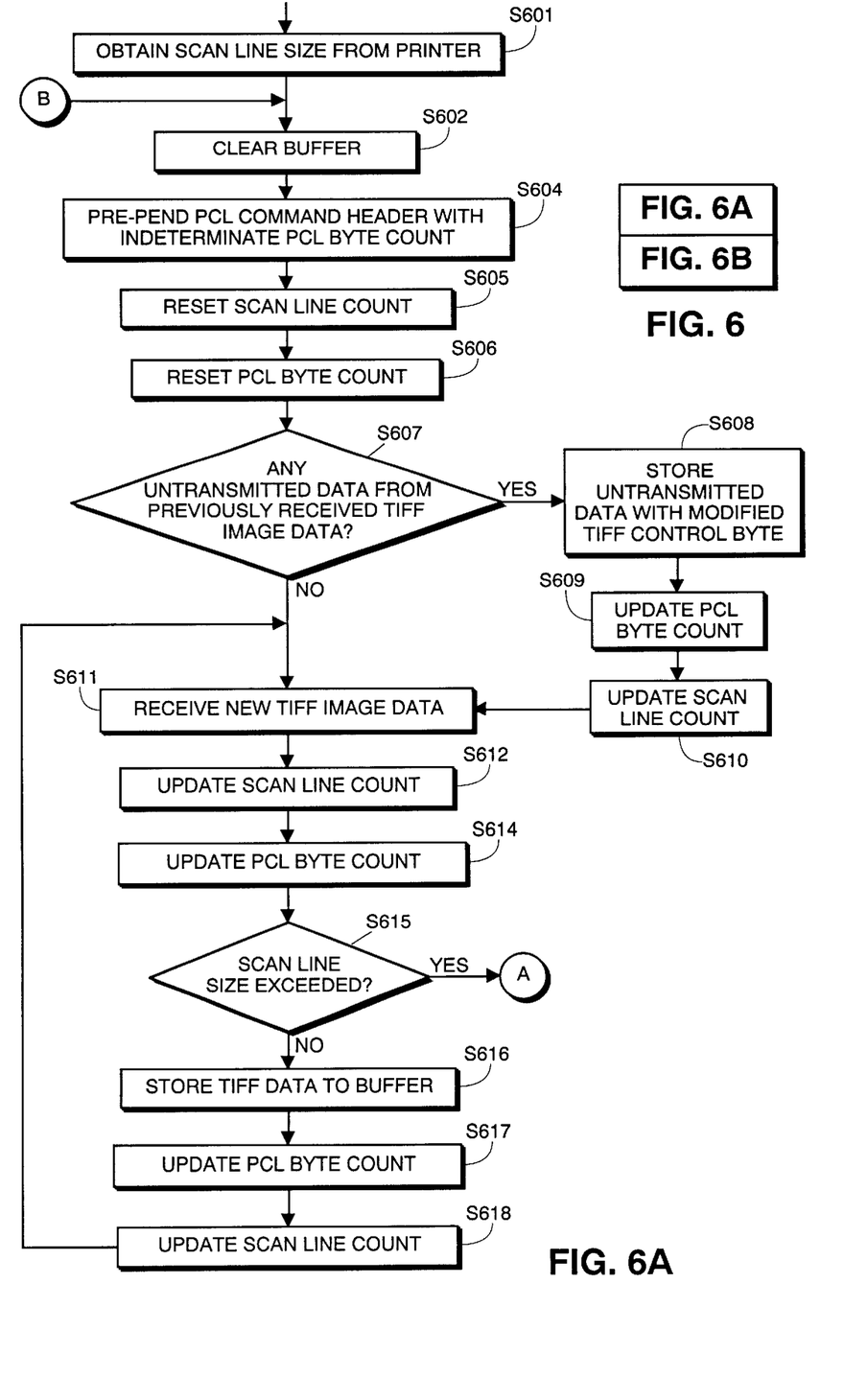
FIG. 6A shows part of details of FIG. 6.
Figure 6B:
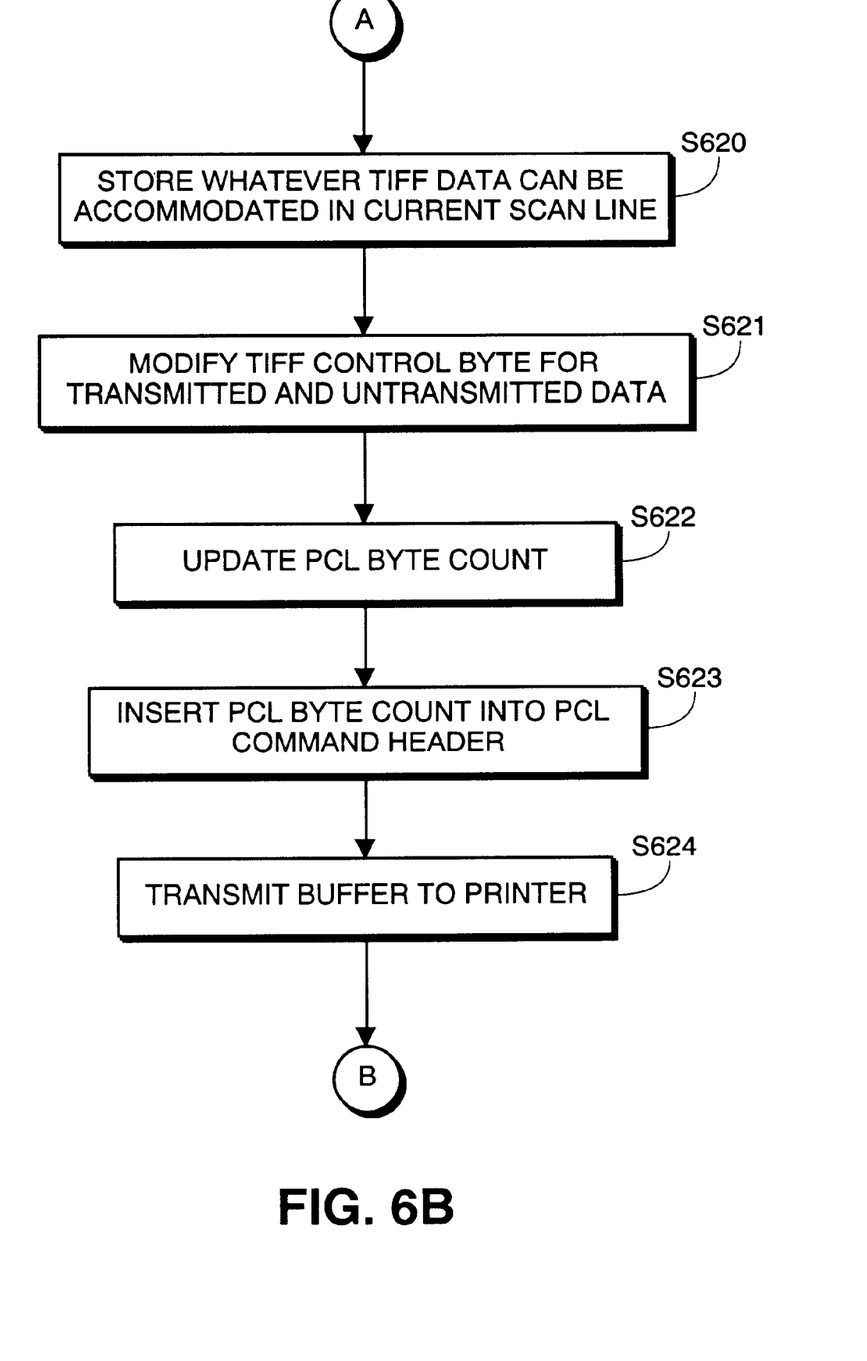
FIG. 6B shows the remaining part of details of FIG. 6.

FIG. 6 is a flow diagram showing process steps for JETSEND agent 46 according to one representative embodiment of the invention. The process steps shown in FIG. 6 are stored on a computer readable medium such as the aforementioned EPROM 116 for execution by a computer. Briefly, according to the process steps shown in FIG. 6, JETSEND-compressed image data is converted into PCL-compatible compressed raster image in units of a scan line for printout by a PCL-enabled printer. Control byte information in the JETSEND-compressed data is monitored as the image data is being stored to a buffer, so as to determine when the end of a scan line has been reached. Responsive to the end of a scan line being reached, the control byte of the final portion of the JETSEND-compressed image data is modified in the buffer so that the data in the buffer corresponds exactly to one scan line in length. The buffer is transmitted with a PCL command pre-pended thereto, the PCL command including a byte count for the number of bytes in the transmission. A new scan line is started in the buffer beginning with any un-transmitted data together with a control byte for the un-transmitted data, with the control byte being modified in accordance with the amount of data that was un-transmitted, and thereafter followed by newly-received JETSEND-compressed image data.

For brevity of explanation, it is assumed that a JETSEND connection has already been established between an image input device such as scanner 104, and an image output device such as printer 115. The details of such negotiation have been omitted.

In any event, flow thereafter commences with step S601 in which JETSEND agent 46 obtains information concerning the length of a scan line. Specifically, PCL commands are scan-line oriented, meaning that image data according-to the PCL format must be transmitted to the printer in units corresponding to the length of a scan line.

In step S602, JETSEND agent 46 clears a buffer which ultimately will contain a PCL transmission for the printer. Specifically, JETSEND agent 46 reserves memory for use by the buffer, such as in DRAM 15. According to the process steps shown in FIG. 6, the buffer will be loaded with a PCL command for raster image data for one scan line of the printer, together with the data, as set forth more fully below.

In step S604, the buffer is pre-pended with a PCL command header Corresponding to a raster image of one scan line of data. Such a command header ordinarily includes a byte count specifying the number of bytes in the PCL command. However, since the byte count has not yet been determined, the PCL byte count for such a command is left indeterminate.

Flow then advances to steps S605 and S606, in which a scan line counter and a PCL byte counter are both reset to zero.

Step S607 determines whether any un-transmitted image data remains, from a previous transmission of JETSEND TIFF-format image data. If any un-transmitted data remains, then flow branches to steps S608 through S610, so as to insert the un-transmitted image data (with appropriate modifications) into the beginning of the data area of the buffer. Steps S608 through S610 are described more fully below.

In either event, flow advances to seep S611, in which JETSEND agent 46 receives a new transmission of JETSEND image data in TIFF format. In step S611, control byte information is inspected to determine the number of pixels of image data represented by the newly-received transmission. The control byte information may either be control byte 52 for run length encoded data, or control byte information 55 for literally-transmitted data. In either event, based on the control byte information, the scan line counter is updated so as to monitor when the end of a scan line has been reached.

Step S614 modifies TIFF data, if desired. Specifically, by convention, image data supplied to a printer uses a bit set to "ONE" to represent a black pixel and a bit set to "ZERO" to represent a white pixel. This convention is exactly opposite to the JETSEND image specification, where a "ZERO" represents black. Accordingly, during conversion from JETSEND compressed data to PCL-compatible format, the invention flips bits so as to modify the JETSEND data. Specifically, step S614 modifies either the repeated data 53 of run length encoded data, or the literal data 56 of literal data, by flipping "ONEs" in the data to "ZEROs" and vice-versa. By modifying the data, the JETSEND format is converted to a PCL-compatible format.

Flow then advances to step S615 which determines whether a scan line has been exceeded. If a scan line has not yet been exceeded, flow advances to step S616 which stores the TIFF data into the buffer, and to steps S617 and S618 which update the PCL byte count and update the current scan line count. Flow then returns to step S611 to receive further TIFF image data from the JETSEND partner.

On the other hand, if a scan line has been exceeded, then flow branches to steps S620 through S624. Step S620 stores all the TIFF data that can be accommodated in the current scan line to the buffer, with step S621 modifying the TIFF control byte for such data so as to correspond to the remaining amount of room (as determined by the scan line count) in the current scan line. For example, in a situation where the scan line counter indicates that only 30 pixels remain in the current scan line, whereas TIFF image data indicates that run length encoded data for an additional 55 white pixels is desired, steps S620 and S621 store data in the buffer corresponding to run length encoded data of white pixels. The remaining 25 pixels remain un-transmitted for the time being.

Step S622 updates the PCL byte count in correspondence to the number of bytes inserted into the buffer by steps 9920 and 9621. In step 9622, the PCL byte count is inserted into the PCL command header such that the byte count corresponds to the total number of bytes in the buffer that are to be transmitted to the printer. Thereafter, step S624 causes the buffer to be transmitted to the printer (via XP module 47). Flow thereupon returns to step S602 where the buffer is cleared in preparation for a new scan line. For any un-transmitted data remaining after execution of step S621, this un-transmitted data is transmitted in the next subsequent scan line by virtue of the operation of steps S608 through S610. Specifically, step S608 stores any un-transmitted data with a modified TIFF control byte in the first data section of the new scan line's buffer. Thus, reverting to the previous example, the remaining 25 pixels of white data are inserted into the buffer in run length encoded format indicating 25 white pixels. Thereafter, steps S609 and S610 update the PCL byte count and the scan line counter, whereupon flow proceeds with step S611, as described above.

By virtue of the arrangement described herein, image data in JETSEND format can be converted in situ, meaning without decompression, into PCL-compatible format for transmission to a printer. Especially for legacy systems which are not currently JETSEND enabled, the invention provides for an upgrade to such legacy systems so that they are JETSEND enabled yet are still capable of operating within the same time constraints that are currently acceptable in conventional NICs.

It is emphasized that several changes may be applied on the above-described system without departing from the teaching of the invention. It is intended that all the matter contained in the present disclosure, or shown in the accompanying drawings, shall be interpreted as illustrative rather than limiting.

What is claimed is:

1. A method for converting compressed image data into a compressed raster image in units of a scan line, the compressed image data including mixed portions of run-length encoded representations in which a first byte is a control byte that specifies a repeat count and a second byte is image data to be repeated, mixed together with literal representation portions in which a first byte is a control byte that specifies a byte count of uncompressed image data bytes that follow, the method comprising the steps of:

- monitoring control byte information as the compressed image data is being stored to a buffer, so as to determine when the end of a scan line has been reached;
- responsive to the end of a scan line being reached, modifying the control byte of the final portion of compressed image data in the buffer so as to correspond to exactly one scan line;
- transmitting image data in the buffer prefixed by a printer description language command that includes a byte count of the number of bytes in the transmission; and
- starting a new scan line in the buffer beginning with any un-transmitted data together with a control byte that specifies either a repeat count or a byte count in correspondence to whether the un-transmitted image data was run length encoded or a literal representation, and followed by newly-received compressed image data.

2. A method according to claim 1, further comprising the step of modifying the compressed image data.

3. A method according to claim 2, wherein modification comprises flipping black and white bits of the compressed image data.

4. An apparatus for converting compressed image data into a compressed raster image in units of a scan line, the compressed image data including mixed portions of run-length encoded representations in which a first byte is a control byte that specifies a repeat count and a second byte is image data to be repeated, mixed together with literal representation portions in which a first byte is a control byte that specifies a byte count of uncompressed image data bytes that follow, said apparatus comprising:

- means for monitoring control byte information as the compressed image data is being stored to a buffer, so as to determine when the end of a scan line has been reached;
- means, responsive to the end of a scan line being reached, for modifying the control byte of the final portion of compressed image data in the buffer so as to correspond to exactly one scan line;
- means for transmitting image data in the buffer prefixed by a printer description language command that includes a byte count of the number of bytes in the transmission; and
- means for starting a new scan line in the buffer beginning with any un-transmitted data together with a control byte that specifies either a repeat count or a byte count in correspondence to whether the un-transmitted image data was run length encoded or a literal representation, and followed by newly-received compressed image data.

5. An apparatus according to claim 4, further comprising means for modifying the compressed image data.

6. An apparatus according to claim 5, wherein modification comprises flipping black and white bits of the compressed image data.

7. An apparatus for converting compressed image data into a compressed raster image in units of a scan line, the compressed image data including mixed portions of run-length encoded representations in which a first byte is a control byte that specifies a repeat count and a second byte is image data to be repeated, mixed together with literal representation portions in which a first byte is a control byte that specifies a byte count of uncompressed image data bytes that follow, comprising:

- a program memory for storing process steps executable to perform (a) a monitoring step to monitor control byte information as the compressed image data is being stored to a buffer, so as to determine when the end of a scan line has been reached; (b) a modifying step, responsive to the end of a scan line being reached, to modify the control byte of the final portion of compressed image data in the buffer so as to correspond to exactly one scan line; (c) a transmitting step to transmit image data in the buffer prefixed by a printer description language command that includes a byte count of the number of bytes in the transmission; and (d) a starting step to start a new scan line in the buffer beginning with any un-transmitted data together with a control byte that specifies either a repeat count or a byte count in correspondence to whether the un-transmitted image data was run length encoded or a literal representation, and followed by newly-received compressed image data; and
- a processor for executing the process steps stored in said program memory.

8. A apparatus according to claim 7, wherein the process steps further comprise a modifying step to modify the compressed image data.

9. An apparatus according to claim 8, wherein modification comprises flipping black and white bits of the compressed image data.

10. A computer-readable medium for storing computer-executable program code, said computer-executable program code for converting compressed image data into a compressed raster image in units of a scan line, the compressed image data including mixed portions of run-length encoded representations in which a first byte is a control byte that specifies a repeat count and a second byte is image data to be repeated, mixed together with literal representation portions in which a first byte is a control byte that specifies a byte count of uncompressed image data bytes that follow, said computer-executable program code comprising:

- code to monitor control byte information as the compressed image data is being stored to a buffer, so as to determine when the end of a scan line has been reached;
- code, responsive to the end of a scan line being reached, to modify the control byte of the final portion of compressed image data in the buffer so as to correspond to exactly one scan line;
- code to transmit image data in the buffer prefixed by a printer description language command that includes a byte count of the number of bytes in the transmission; and
- code to start a new scan line in the buffer beginning with any untransmitted data together with a control byte that specifies either a repeat count or a byte count in correspondence to whether the un-transmitted image data was run length encoded or a literal representation, and followed by newly-received compressed image data.

11. Computer-readable program code according to claim 10, further comprising:

code to modify the compressed image data.

12. Computer-readable program code according to claim 11, wherein modification comprises flipping black and white bits of the compressed image data.

* * * * *

UNITED STATES PATENT AND TRADEMARK OFFICE
CERTIFICATE OF CORRECTION

PATENT NO. : 6,298,164 B1  Page 1 of 1
DATED : October 2, 2001
INVENTOR(S) : Stephanie Ann Suzuki et al.

It is certified that error appears in the above-identified patent and that said Letters Patent is hereby corrected as shown below:

Column 2,
Line 52, "Conversion" should read -- conversion --; and
Line 60, "Qbtained" should read -- obtained --.

Column 3,
Line 20, "(LAN's),100," should read -- (LANs) 100, --; and
Line 40, "accept to Liles" should read -- access to files --.

Column 5,
Line 6, "FIG. 2." should read -- FIG. 3. --; and
Line 43, "devises," should read -- devices, --.

Column 6,
Line 6, "FIG. 1" should read -- FIG. 4 --.

Column 7,
Line 20, "according-to" should read -- according to --; and
Line 31, "Corresponding" should read -- corresponding --.

Column 8,
Line 28, "9920" should read -- S620 --;
Line 29, "9621." should read -- S621. --; and "9622," should read -- S623, --; and
Line 48, "in situ," should be italicized.

Signed and Sealed this

Twenty-fifth Day of June, 2002

Attest:

JAMES E. ROGAN
Attesting Officer  Director of the United States Patent and Trademark Office